United States Patent
Rama Chandran

(10) Patent No.: US 12,407,448 B2
(45) Date of Patent: Sep. 2, 2025

(54) METHOD AND APPARATUS FOR ROBUST MESSAGE TRANSMISSION RECEPTION OVER FRONTHAUL NETWORK

(71) Applicant: Samsung Electronics Co., Ltd., Suwon-si (KR)

(72) Inventor: Sanil Rama Chandran, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 18/055,366

(22) Filed: Nov. 14, 2022

(65) Prior Publication Data

US 2023/0208559 A1 Jun. 29, 2023

Related U.S. Application Data

(60) Provisional application No. 63/281,463, filed on Nov. 19, 2021.

(51) Int. Cl.
*H04W 72/21* (2023.01)
*H04L 1/1607* (2023.01)

(52) U.S. Cl.
CPC .................. *H04L 1/1607* (2013.01)

(58) Field of Classification Search
CPC ... H04L 1/1607; H04L 1/1671; H04L 1/1685; H04L 1/1854; H04L 1/188
See application file for complete search history.

(56) References Cited

U.S. PATENT DOCUMENTS

| | | |
|---|---|---|
| 9,871,670 B1 | 1/2018 | Hsu et al. |
| 11,889,508 B1 * | 1/2024 | Anderson ............ H04W 72/21 |
| 2009/0147734 A1 | 6/2009 | Naka et al. |
| 2017/0245186 A1 * | 8/2017 | Sakurai ................ H04W 16/32 |
| 2020/0235788 A1 | 7/2020 | Rajagopal et al. |
| 2021/0136788 A1 | 5/2021 | Lim et al. |
| 2021/0176802 A1 | 6/2021 | Sirotkin et al. |
| 2021/0243840 A1 | 8/2021 | Raghothaman et al. |

(Continued)

FOREIGN PATENT DOCUMENTS

| | | |
|---|---|---|
| EP | 3836420 A1 | 6/2021 |
| JP | 2006148360 A | 6/2006 |

(Continued)

OTHER PUBLICATIONS

International Search Report and Written Opinion issued Feb. 28, 2023 regarding International Application No. PCT/KR2022/018225 7 pages.

(Continued)

*Primary Examiner* — Phuc H Tran

(57) ABSTRACT

Methods and apparatuses for handling an acknowledgement of C-plane message in a wireless communication system. A method of a transmitter device comprises: generating a section extension for an ACK/NACK request including an ackNackReqId field and an extLen field, wherein the ackNackReqId field indicates the ACK/NACK request ID of a section description and the extLen field indicates a size of the section extension; transmitting, to a receiver device, the C-plane message including the section extension for the ACK/NACK request; and receiving, from the receiver device, an ACK message corresponding to the C-plane message.

20 Claims, 12 Drawing Sheets

(56) References Cited

U.S. PATENT DOCUMENTS

| | | |
|---|---|---|
| 2022/0216952 A1 | 7/2022 | Nishio et al. |
| 2023/0105918 A1* | 4/2023 | Vagner ................ H04W 72/044 |
| | | 370/330 |
| 2024/0080154 A1* | 3/2024 | Vagner .................. H04L 5/0032 |
| 2024/0162955 A1* | 5/2024 | Whinnett .............. H04W 24/10 |

FOREIGN PATENT DOCUMENTS

| | | | |
|---|---|---|---|
| RU | 2176435 C2 | 11/2001 | |
| WO | 2020218231 A1 | 10/2020 | |
| WO | 2021161474 A1 | 8/2021 | |
| WO | WO-2022046980 A2 * | 3/2022 | ........... H04L 5/0048 |

OTHER PUBLICATIONS

"O-RAN Working Group 4 (Open Fronthaul Interfaces WG) Control, User and Synchronization Plane Specification", O-RAN.WG4.CUS.0-v10.00, Jul. 2022, 358 pages.

Russian Patent Office, Office Action issued Oct. 10, 2024 regarding Application No. 2024113302, 12 pages.

Extended European Search Report issued Nov. 22, 2024 regarding Application No. 22896102.5, 9 pages.

IP Australia, Examination Report issued Dec. 12, 2024 regarding Application No. 2022389947, 2 pages.

Japanese Patent Office, Office Action issued Mar. 25, 2025 regarding Application No. 2024-529676, 15 pages.

* cited by examiner

AckNackRequest Section Extension format

| 0 (msb) | 1 | 2 | 3 | 4 | 5 | 6 | 7 (lsb) | # of bytes | |
|---|---|---|---|---|---|---|---|---|---|
| ef | | | | | | | | 1 | Octet N |
| extLen = 0x01 | | | | | | | | 1 | Octet N+1 |
| ackNackReqId | | | | | | | | 1 | Octet N+2 |

Section Type 8: ACK Message, O-RU to O-DU

| | 0 (msb) | 1 | 2 | 3 | 4 | 5 | 6 | 7 (lsb) | # of bytes | |
|---|---|---|---|---|---|---|---|---|---|---|
| | | | | | | | | | 5 | |
| | \multicolumn{8}{c|}{transport header, see clause 3.1.3} | 8 | Octet 1 |
| | reserved | | | | | | | | 1 | Octet 9 |
| | \multicolumn{4}{c|}{protocol Version} | \multicolumn{4}{c|}{reserved} | 1 | Octet 10 |
| | subframeId | | | | | | | | 1 | Octet 11 |
| | \multicolumn{4}{c|}{slotId} | reserved or startSymbolId | | | | 1 | Octet 12 |
| | reserved | | | | | | | | 1 | Octet 13 |
| | reserved | | | | | | | | 1 | Octet 14 |
| | sectionType = 8 | | | | | | | | 1 | |
| | numberOfACKs | | | | | | | | 1 | Octet 15 |
| | 1st ackId | | | | | | | | 2 | Octet 16 |
| | 2nd ackId | | | | | | | | 2 | Octet 18 |
| | ... | | | | | | | | | |
| | Nth ackId | | | | | | | | 2 | Octet 14+2n |
| | numberOfNACKs | | | | | | | | 1 | Octet 16+2n |
| | 1st nackId | | | | | | | | 2 | Octet 18+2n |
| | 2nd nackId | | | | | | | | 2 | Octet 20+2n |
| | ... | | | | | | | | | |
| | mth nackId | | | | | | | | 2 | Octet 15+2(m+n) |

900

METHOD AND APPARATUS FOR ROBUST MESSAGE TRANSMISSION RECEPTION OVER FRONTHAUL NETWORK

CROSS-REFERENCE TO RELATED APPLICATIONS AND CLAIM OF PRIORITY

The present application claims priority to U.S. Provisional Patent Application No. 63/281,463, filed on Nov. 19, 2021. The contents of the above-identified patent documents are incorporated herein by reference.

TECHNICAL FIELD

The present disclosure relates generally to communication systems and, more specifically, the present disclosure relates to a robust message transmission and reception over a fronthaul network.

BACKGROUND

5th generation (5G) or new radio (NR) mobile communications is recently gathering increased momentum with all the worldwide technical activities on the various candidate technologies from industry and academia. In current open radio access network (O-RAN) fronthaul network, the robustness of the underlying network is required and several ways for a message sender to detect transmission failure of messages over front-haul network or decoding failure of messages at receiver are provided.

SUMMARY

The present disclosure relates to communication systems and, more specifically, the present disclosure relates to a robust message transmission and reception over a fronthaul network.

In one embodiment, a transmitter device of a base station for handling an acknowledgement of control plane (C-plane) message in a wireless communication system is provided. The DU comprises a processor configured to generate a section extension for an acknowledgement/negative acknowledgement (ACK/NACK) request including an ACK/NACK request identifier (ackNackReqId) field and a length (extLen) field, wherein the ackNackReqId field indicates the ACK/NACK request identifier (ID) of a section description and the extLen field indicates a size of the section extension. The transmitter device further comprises a transceiver operably coupled to the processor, the transceiver configured to: transmit, to a receiver device, the C-plane message including the section extension for the ACK/NACK request, and receive, from the RU, an ACK message corresponding to the C-plane message.

In another embodiment, a receiver device for handling an acknowledgement of C-plane message in a wireless communication system is provided. The receiver device comprises a transceiver configured to receive, from a transmitter device, the C-plane message including a section extension for an ACK/NACK request. The receiver device further comprises a processor operably coupled to the transceiver, the processor configured to identify the section extension included in the C-plane message for the ACK/NACK request including an ackNackReqId field and an extLen field, wherein the ackNackReqId field indicates the ACK/NACK request ID of a section description and the extLen field indicates a size of the section extension. The transceiver of the receiver device is further configured to transmit, to the transmitter device, an ACK message corresponding to the C-plane message.

In yet another embodiment, a method of a transmitter device of a base station for handling an acknowledgement of C-plane message in a wireless communication system is provided. The transmitter device comprises: generating a section extension for an ACK/NACK request including an ackNackReqId field and a extLen field, wherein the ackNackReqId field indicates the ACK/NACK request ID of a section description and the extLen field indicates a size of the section extension; transmitting, to a receiver device, the C-plane message including the section extension for the ACK/NACK request; and receiving, from the receiver device, an ACK message corresponding to the C-plane message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of message format according to embodiments of the present disclosure;

FIG. 9 illustrates another example of message format according to embodiments of the present disclosure;

DETAILED DESCRIPTION

FIGS. 1 through 12, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
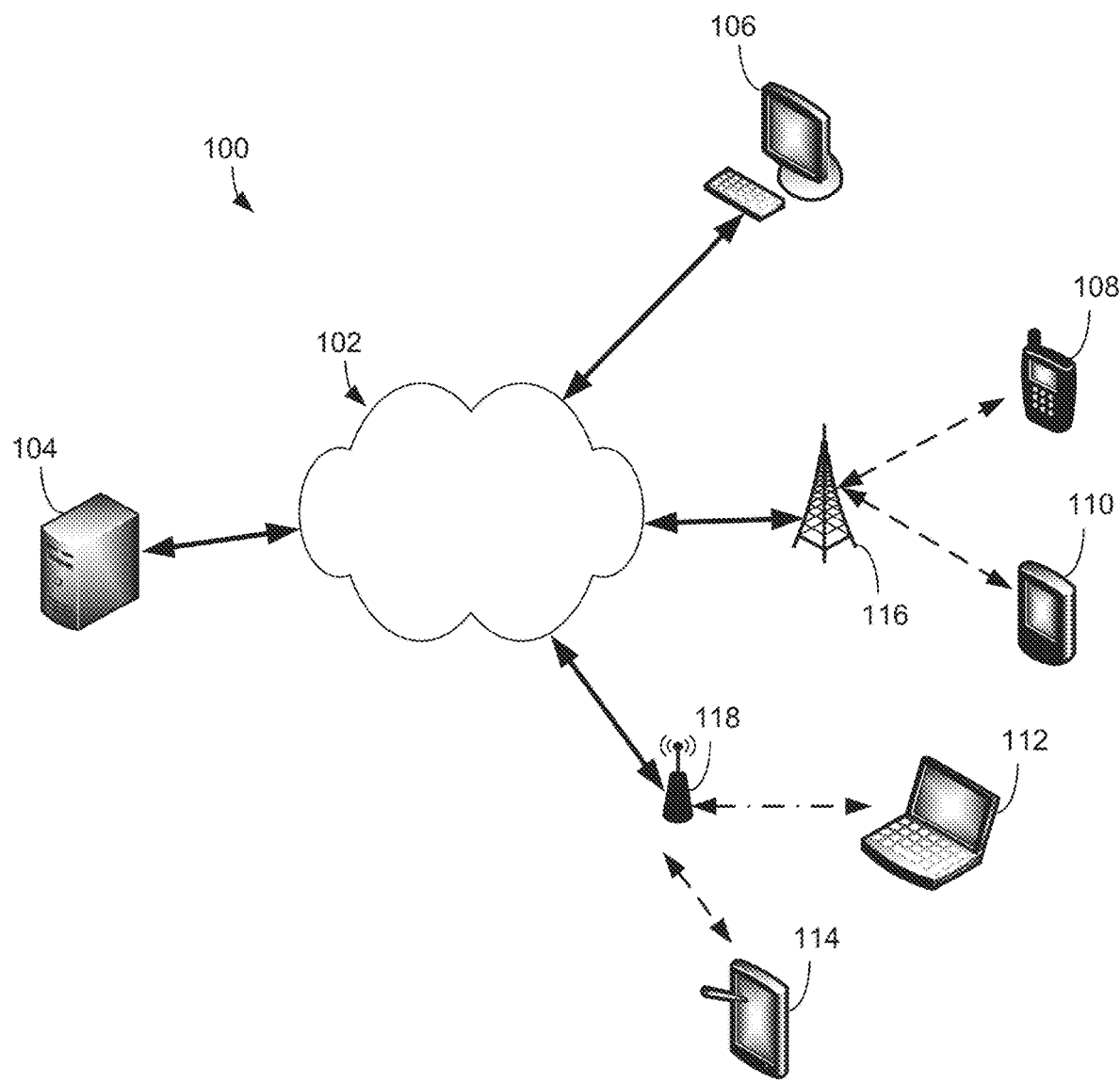
FIG. 1 illustrates an example of communications system according to embodiments of the present disclosure.

FIG. 1 illustrates an example communications system 100 according to this disclosure. The embodiment of the communications system 100 shown in FIG. 1 is for illustration only. Other embodiments of the communications system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114 such as a user equipment (UE), a terminal, or any device including capability of communication. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable communications or processing device that interacts with at least one server or other communications device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the communications system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a communications system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
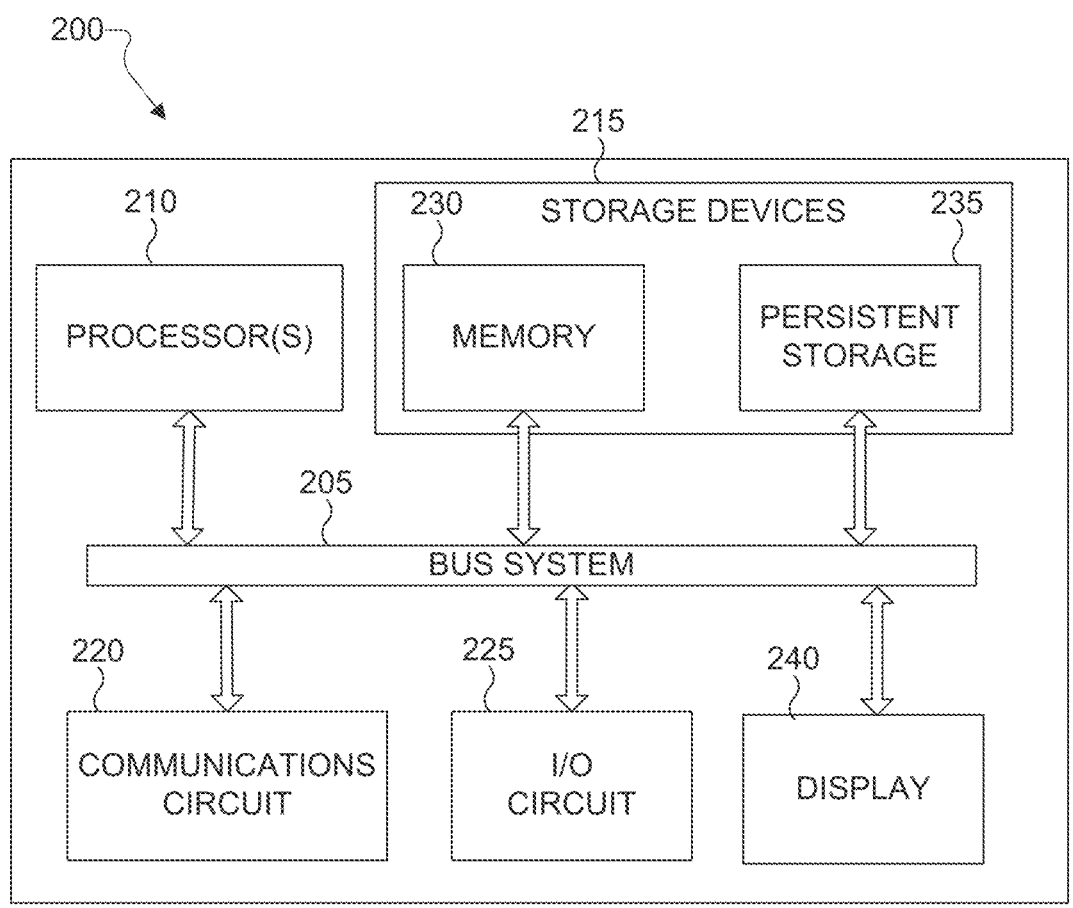
FIG. 2 illustrates an example of network entity according to embodiments of the present disclosure.
Figure 3:
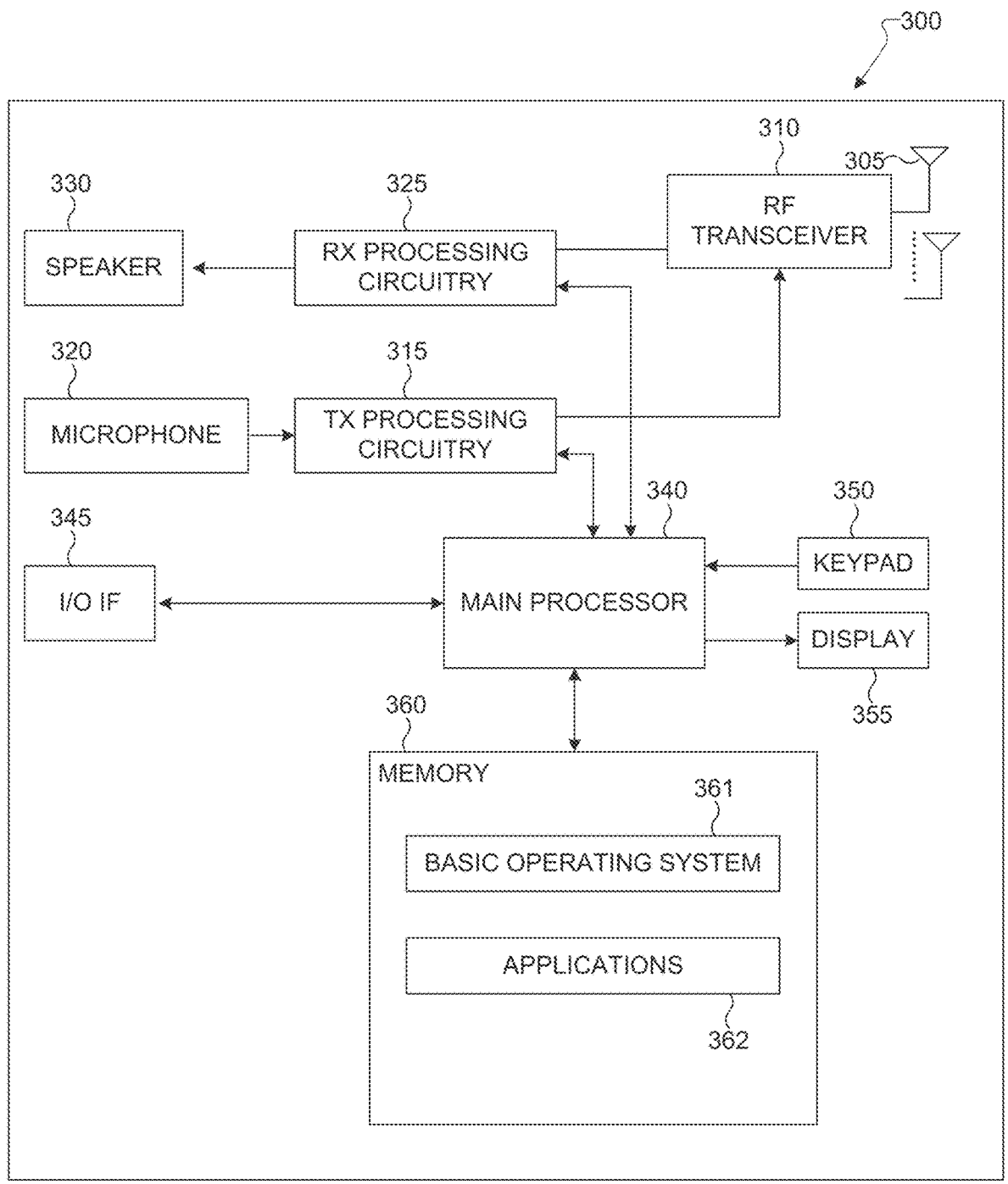
FIG. 3 illustrates an example of client device according to embodiments of the present disclosure.

FIGS. 2 and 3 illustrate example devices in a communications system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processor 210, at least one storage device 215, at least one communications circuit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 is also capable of executing other processes and programs resident in the memory 230, such as processes for a robust message transmission and reception over a fronthaul network in a wireless communication system.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications circuit 220 supports communications with other systems or devices. For example, the communications circuit 220 could include a network interface card or a wireless transceiver facilitating communications over the network 102. The communications circuit 220 may support communications through any suitable physical or wireless communication link(s).

The I/O circuit 225 allows for input and output of data. For example, the I/O circuit 225 may provide a connection for user input through a keyboard, mouse, keypad, touchscreen, or other suitable input device. The I/O circuit 225 may also send output to a display, printer, or other suitable output device.

The processor 210 is also coupled to the display 240. The display 240 may be a liquid crystal display or other display capable of rendering text and/or at least limited graphics, such as from web sites.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

FIG. 3 illustrates an example client device 116 according to embodiments of the present disclosure. The embodiment of the client device 116 illustrated in FIG. 3 is for illustration only, and the client devices 106-114 of FIG. 1 could have the same or similar configuration. However, the client devices come in a wide variety of configurations, and FIG. 3 does not limit the scope of this disclosure to any particular implementation of a client device.

As shown in FIG. 3, the client devices 106-114 may include an antenna 305, a radio frequency (RF) transceiver 310, TX processing circuitry 315, a microphone 320, and RX processing circuitry 325. The client device 104-116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a network entity (e.g., gNB, BS, eNB) of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the client devices 106-114. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a robust message transmission and reception over a fronthaul network in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the client device 106-114 with the ability to connect to other devices, such as laptop computers and handheld computers. The I/O interface 345 is the communication path between these accessories and the processor 340.

The processor 340 is also coupled to the touchscreen 350 and the display 355. The operator of the client device 106-114 can use the touchscreen 350 to enter data into the client device 106-114. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of client device 106-114, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the client device configured as a mobile telephone or smartphone, UEs could be configured to operate as other types of mobile or stationary devices.

Figure 4:
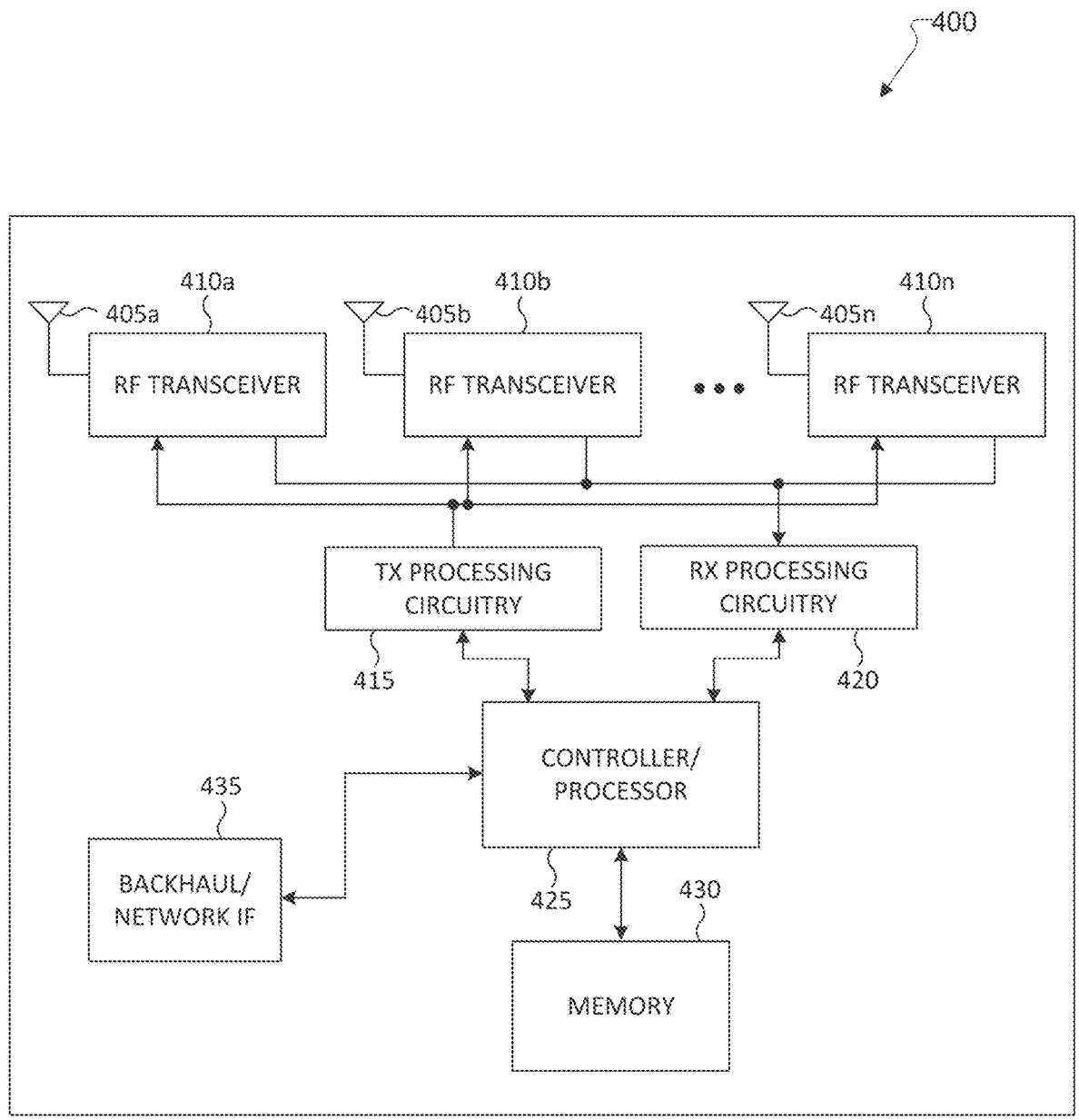
FIG. 4 illustrates an example of base station according to embodiments of the present disclosure.

FIG. 4 illustrates an example base station (e.g., 116 and 118) according to embodiments of the present disclosure. The embodiment of the base station 400 illustrated in FIG. 4 is for illustration only, and the base stations 116 and 118 of FIG. 1 could have the same or similar configuration. However, the base stations come in a wide variety of configurations, and FIG. 2 does not limit the scope of this disclosure to any particular implementation of a base station.

As shown in FIG. 2, the bae station 400 includes multiple antennas 405a-405n, multiple RF transceivers 410a-410n, transmit (TX) processing circuitry 415, and receive (RX) processing circuitry 420. The bae station 400 also includes a controller/processor 425, a memory 430, and a backhaul or network interface 435.

The RF transceivers 410a-410n receive, from the antennas 405a-405n, incoming RF signals, such as signals transmitted by the client devices such as UEs in the network 100. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the bae station 400. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing/incoming signals from/to multiple antennas 405a-405n are weighted differently to effectively steer the outgoing signals in a desired direction. Any of a wide variety of other functions could be supported in the bae station 400 by the controller/processor 425.

The controller/processor 225 is also capable of executing programs and other processes resident in the memory 430, such as an OS. The controller/processor 425 can move data into or out of the memory 430 as required by an executing process.

The controller/processor 425 is also coupled to the backhaul or network interface 435. The backhaul or network interface 435 allows the bae station 400 to communicate with other devices or systems over a backhaul connection or over a network. The interface 435 could support communications over any suitable wired or wireless connection(s). For example, when the bae station 400 is implemented as part of a cellular communication system (such as one supporting 5G/NR, LTE, or LTE-A), the interface 435 could allow the bae station 400 to communicate with other gNBs over a wired or wireless backhaul connection. When the bae station 400 is implemented as an access point, the interface 435 could allow the bae station 400 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a flash memory or other ROM.

Although FIG. 4 illustrates one example of bae station 400, various changes may be made to FIG. 4. For example, the bae station 400 could include any number of each component shown in FIG. 4. As a particular example, an access point could include a number of interfaces 435, and the controller/processor 425 could support for the robust message transmission and reception over a fronthaul network. As another particular example, while shown as including a single instance of TX processing circuitry 415 and a single instance of RX processing circuitry 420, the bae station 400 could include multiple instances of each (such as one per RF transceiver). Also, various components in FIG. 4 could be combined, further subdivided, or omitted and additional components could be added according to particular needs.

Figure 5:
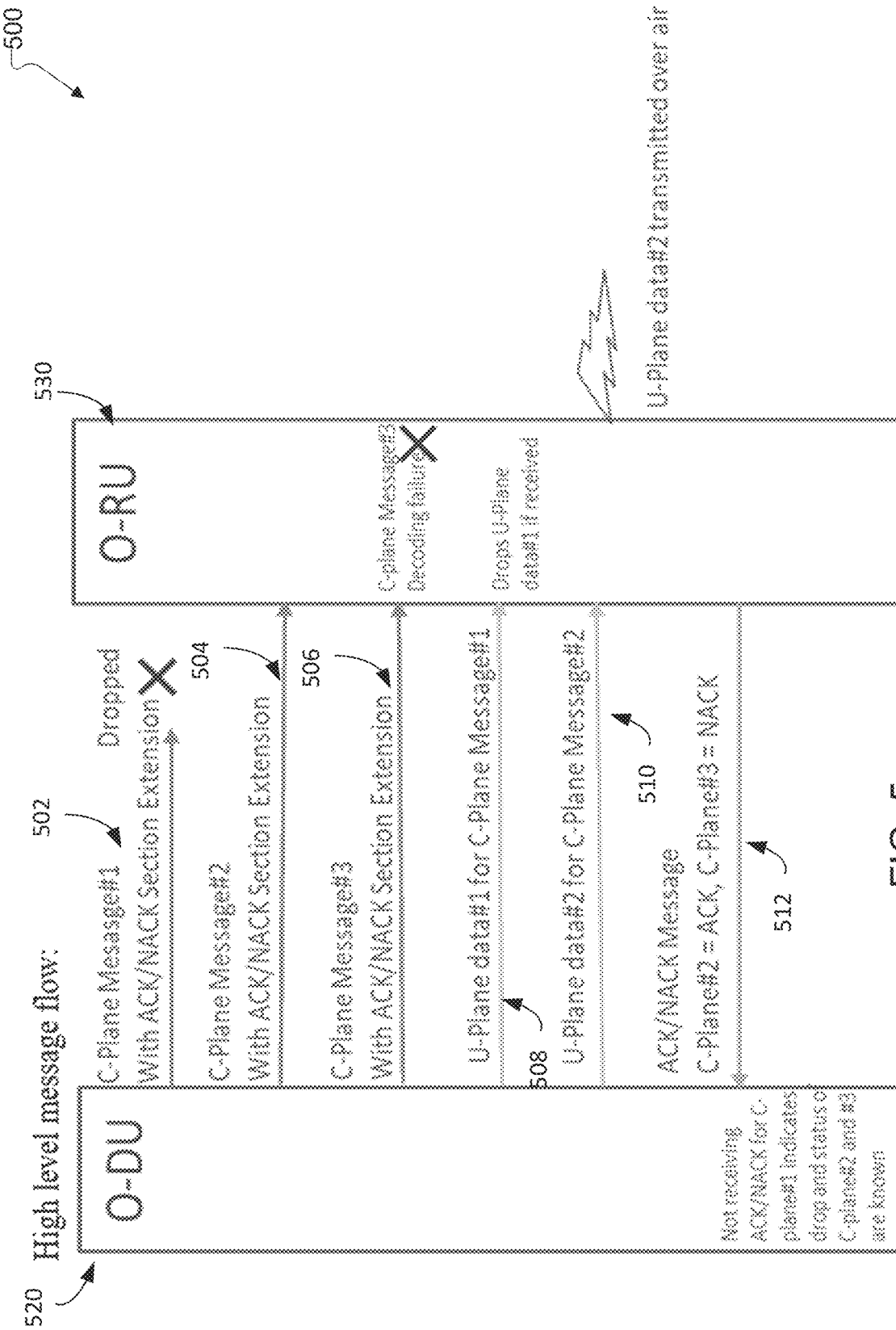
FIG. 5 illustrates an example of high level message flow according to embodiments of the present disclosure.

Although FIGS. 2, 3, and 5 illustrate examples of devices in a communications system, various changes may be made to FIGS. 2, 3, and 4. For example, various components in FIGS. 2, 3, and 4 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2, 3, and 4 do not limit this disclosure to any particular client device or server.

In current O-RAN fronthaul protocol specification, the robustness of the underlying network is assumed and there is no way for sender to detect transmission failure of messages over front-haul network or decoding failure of messages at receiver.

In one example, an open distributed unit (O-DU) (e.g., baseband unit (BBU)) sends control-plane messages to an open-radio unit (O-RU) describing how to transmit the user-plane data over air in downlink direction or how to receive on-air data and send to O-DU in uplink.

In one example, if the control-plane packet is lost in the fronthaul network or not correctly decoded by O-RU, then O-RU cannot transmit the data in DL or receive data in UL.

In one example, this information of user-data not being transmitted over air is not available at O-DU for taking further action for a very long period of time (i.e., until $3^{rd}$ generation partnership project (3GPP) hybrid automatic repeat and request (HARQ) or an ARQ feedback from a UE is received).

Sender of O-RAN messages over a fronthaul interface has no way of understanding whether the messages are received at receiver, if received whether those messages are decoded correctly at the receiver. In some cases, not having this information can cause outages in mobile network transmission and reception.

Embodiments of the present disclosure provide a method of signaling a sender's (e.g., O-DU) intention to receive feedback from the receiver (e.g., O-RU) about the status of reception and status of decoding of messages sent by the sender.

In one embodiment, a new section extension is provided for this purpose. This section extension can be appended to existing O-RAN control-plane messages.

In one example, upon receiving the section extension indicating request for feedback along with the message, receiver (e.g., O-RU) of the message sends the status of message decoding to the sender (e.g., O-DU). The present disclosure provides a creation of a new control plane message type (section type 8) in the O-RAN specification for this purpose.

In one example, a new section extension to a c-plane message to request acknowledgement of reception and decoding status of the c-plane message (e.g., acknowledgement/negative acknowledgement (ACK/NACK)) is provided.

In one example, an O-DU appends the provided new section extension to a C-plane messages to request ACK/NACK feedback.

In one example, a new message from an O-RU to an O-DU to indicate the ACK/NACK status of section descriptions in the C-plane message is provided.

FIG. 5 illustrates an example of high level message flow 500 according to embodiments of the present disclosure. The high level message flow 500 as may be performed by a network entity (e.g., network 102 and 200 as illustrated in FIG. 2) and/or a client device (e.g., 106-114 as illustrated in FIG. 1). For example, the O-DU 520 may be implemented in one of network entity in 102, in a server 104, and/or in base stations 116 and 118. Specifically, the base station 116 and 118 may be implemented in a gNB including a logical node hosting RLC/MAC/high-PHY layers based on a lower layer functional split. For example, the O-RU 530 may be implemented in base stations 116 and 118. Specifically, the base station 116 and 118 may be implemented in a remote radio head (RRH) or a transmission and reception point (TRP) including a logical node hosting low-PHY layer and RF processing based on a lower layer functional split.

An embodiment of the high level message flow 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

As illustrated in FIG. 5, in step 502, an O-DU (520) sends a C-plane message #1 with ACK/NACK section extension to an O-RU (530). However, this transmission is dropped and not correctly sent to the O-RU (530). In step 504, the O-RU (530) sends a C-plane message #2 with ACK/NACK section extension to the O-RU (530) and this message is successfully sent to the O-RU (530). In step 506, the O-RU (530) sends a C-plane message #3 with ACK/NACK section extension to the O-RU (530) and this message is successfully sent to the O-RU (530). However, the O-RU (530) fails to decode this message #3 correctly. In step 508, the O-RU (530) sends U-plane data #1 for the C-plane message #1, but the U-plane data #1 is dropped if the O-RU (530) receives this. In step 510, the O-RU (530) sends U-plane data #2 for the C-plane message #2. In step 512, the O-RU (530) sends an ACK/NACK message with: (1) C-plane #1=ACK and (2) C-plane #3=NACK.

Figure 6:
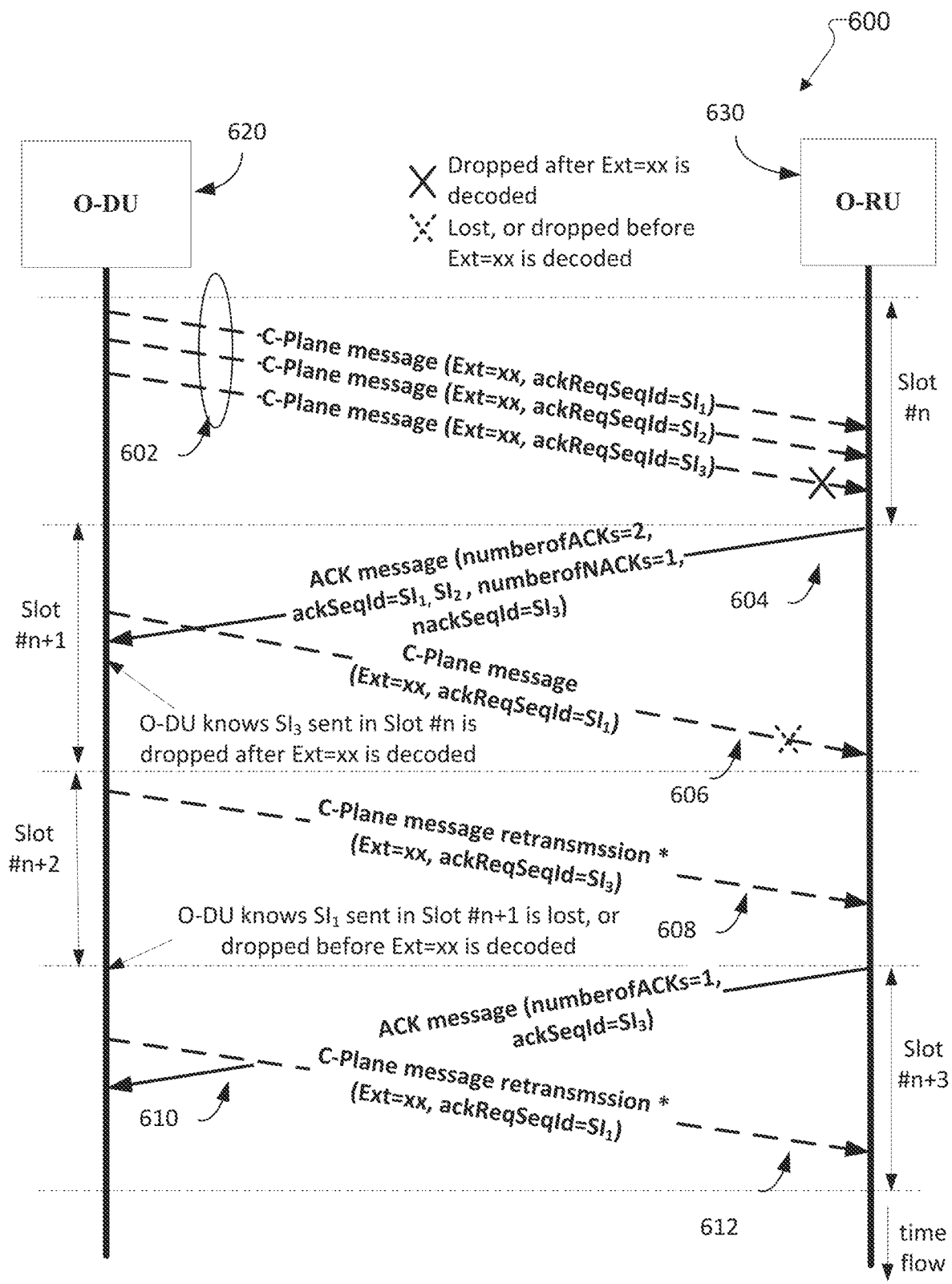
FIG. 6 illustrate example of message flow for a robust message transmission and reception according to embodiment of the present disclosure.

FIG. 6 illustrate example of message flow 600 for a robust message transmission and reception according to embodiment of the present disclosure. The message flow 600 as may be performed by a network entity (e.g., network 102 and 200 as illustrated in FIG. 2) and/or a client device (e.g., 106-114 as illustrated in FIG. 1). An embodiment of the message flow 600 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

For example, the O-DU 620 may be implemented in one of network entities in 102, in a server 104, and/or in base stations 116 and 118. Specifically, the base station 116 and 118 may be implemented in a gNB including a logical node hosting RLC/MAC/high-PHY layers based on a lower layer functional split. For example, the O-RU 630 may be implemented in base stations 116 and 118. Specifically, the base station 116 and 118 may be implemented in an RRH or a TRP including a logical node hosting low-PHY layer and RF processing based on a lower layer functional split.

As illustrated in FIG. 6, in step 602, an O-DU (620) sends C-plane messages to an O-RU (630). During the transmission, the C-plane message (Ext=xx, ackReqSeqId=S13) is dropped after Ext=xx is decoded in a slot #n. For example, in this instance, "xx" may be set to "22." In step 604, the O-RU (630) sends an ACK message (numberofACKs=2, ackSeqId=$SI_1$, $SI_2$, numberofNACKs=1, nackSeqId=$SI_3$) to the O-DU (630). Based on nackSeqId set to $SI_3$, the O-DU knows $SI_3$ sent in Slot #n, in step 604 is dropped after Ext=xx is decoded. In step 606, the C-Plane message (Ext=xx, ackReqSeqId=$SI_1$) is lost or dropped before Ext=xx is decoded. In step, 608, the O-DU (620) transmits C-Plane message retransmssion (Ext=xx, ackReqSeqId=$SI_3$) to the O-RU (630). At the end of Slot #n+2, the O-DU knows $SI_1$ sent in Slot #n+1 in step 606 is lost or dropped before Ext=xx is decoded. In step 610, the O-RU (630) transmits the ACK message (numberofACKs=1, ackSeqId=$SI_3$). In step 612, the O-DU (620) transmits the C-Plane message retransmssion (Ext=xx, ackReqSeqId=$SI_1$) in the slot #n+3.

Figure 7:
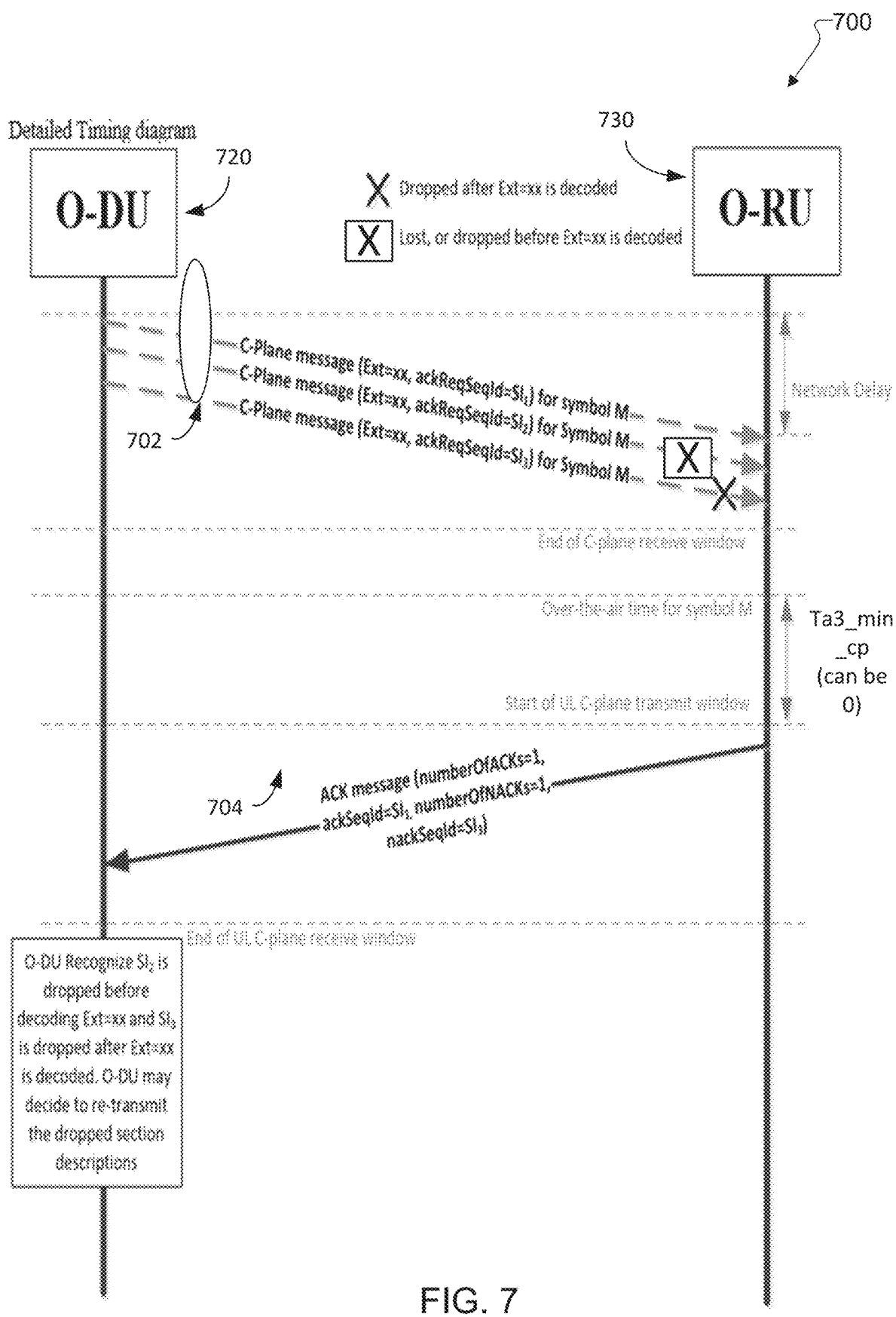
FIG. 7 illustrate another example of message flow for a robust message transmission and reception according to embodiment of the present disclosure.

FIG. 7 illustrate another example of message flow 700 for a robust message transmission and reception according to embodiment of the present disclosure. The message flow 700 as may be performed by a network entity (e.g., network 102 and 200 as illustrated in FIG. 2) and/or a client device (e.g., 106-114 as illustrated in FIG. 1). An embodiment of the message flow 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

For example, the O-DU 720 may be implemented in one of network entities in 102, in a server 104, and/or in base stations 116 and 118. Specifically, the base station 116 and 118 may be implemented in a gNB including a logical node hosting RLC/MAC/high-PHY layers based on a lower layer functional split. For example, the O-RU 730 may be implemented in base stations 116 and 118. Specifically, the base station 116 and 118 may be implemented in an RRH or a TRP including a logical node hosting low-PHY layer and RF processing based on a lower layer functional split.

As illustrated in FIG. 7, in step 702, an O-DU (720) sends C-plane messages to an O-RU (730). During the transmission, the C-plane message (Ext=xx, ackReqSeqId=S12) for symbol M is lost or dropped before "Ext=xx" is decoded. In step 702, the C-plane message (Ext=xx, ackReqSeqId=S13) for symbol M is dropped after Ext=xx is decoded. In Step 702, the C-plane message (Ext=xx, ackReqSeqId=S11) for symbol M is received and correctly decoded. In step 704, the O-RU (730) transmits the ACK/NACK message (numberofACKs=1, ackSeqId=SI1, numberofNACKs=1, nackSeqId=SI3) after Ta3_min_cp_ack from the time over-the-air time for symbol M, which is, the start of the UL C-plane transmit window Tax_min_cp_ack can be 0 or a negative value. In step 702, the O-DU receives the ACK/NACK message (numberofACKs=1, ackSeqId=SI1, numberofNACKs=1, nackSeqId=SI3) between the start of UL U-plane receive window and End of UL U-plane receive window. The O-DU recognizes that SI2 is dropped before decoding Ext=xx and SI3 is dropped after decoding Ext=xx is decoded. The O-DU may decide to retransmit the dropped section descriptions.

FIG. 8 illustrates an example of message format 800 according to embodiments of the present disclosure. An embodiment of the message format 800 shown in FIG. 8 is for illustration only.

In one embodiments, an AckNackRequest section extension format is provided as shown in FIG. 8.

TABLE 1 shows the description of the newly provided fields for the AckNackRequest section extension format as illustrated in FIG. 8.

TABLE 1

| Field | Description | Value Ranges | Field length |
|---|---|---|---|
| extType | This is an existing field, a new value "AckNAckRequest Section Extension" is newly provided. The value of AckNackRequest Section Extension can be any value (e.g., set to "22") which not used by other Section Extension in the O-RAN specification. Presence of this section extension indicates that O-RU may report ACK/NACK status if the corresponding section description in the C-plane message | AckNAckRequest Section Request | 7 bits |
| extLen | This is an existing field and the value of this field may be set to "1." Value 1 indicates that the size of this newly provided extension is 4 octets. | 1 | 8 bits |
| ackNackReqId (e.g., ackNackReqSeqId) | Newly provided field in the new Section Extension Message. This field indicates the sequence id to be used when reporting ACK/NACK status to O-DU | 0~65534. The value 65535 is reserved | 16 bits |

TABLE 2 shows the description of the Type #8 message format.

TABLE 2

Type #8 message format

| Field | Description | Value Ranges | Field length |
|---|---|---|---|
| numberofACKs | Indicates number of ACK sequence Ids (ackSeqId) included in the message | 1~255 | 7 bits |
| ackId (e.g., ackSeqId) | Indicates the sequence id of the correctly decoded section description included in the AckNackRequest Section Extension appended to the section description | 0~65534 | 8 bits |
| numberOfNACKs | Indicates number of NACK sequence Ids (nackSeqId) included in the message | 1~255 | 16 bits |
| nackId (e.g., nackSeqId) | Indicates the sequence id of the section description for which decoding failed | 0~655334 | 16 bits |

FIG. 9 illustrates another example of message format 900 according to embodiments of the present disclosure. An embodiment of the message format 900 shown in FIG. 9 is for illustration only.

As illustrated in FIG. 9, the message format 900 includes followings fields:
  Transport header field: this field indicates basic data routing capabilities, including description of the data flow type, sending and reception port identifiers, ability to support concatenation of multiple application messages in a single Ethernet packet, and sequence numbering;
  Reserved field: this field is reserved for future use,
  Payload version field: this field indicate the payload protocol version,
  FrameId field: this field indicates a frame identification and a counter for 10 ms frames,
  subframeID field: this field indicates a subframe identification and a counter for 1 ms subframe
  SlotId field: this field indicate the slot number within a 1 ms subframe
  SymbolId field: this field indicates the symbol number,
  SetionType field: this field indicates the characteristics of U-plane date,
  numberOfAcks field: this field indicates a number of ACKs,
  numbeOfNacks field: this field indicates a number of NACKs,
  ackId field: this field indicates the identification of Ack,
  nackId field: this field indicates the identification for Nack, and
  Padding field: this field is used to align with 32 bit boundary.

Figure 10:
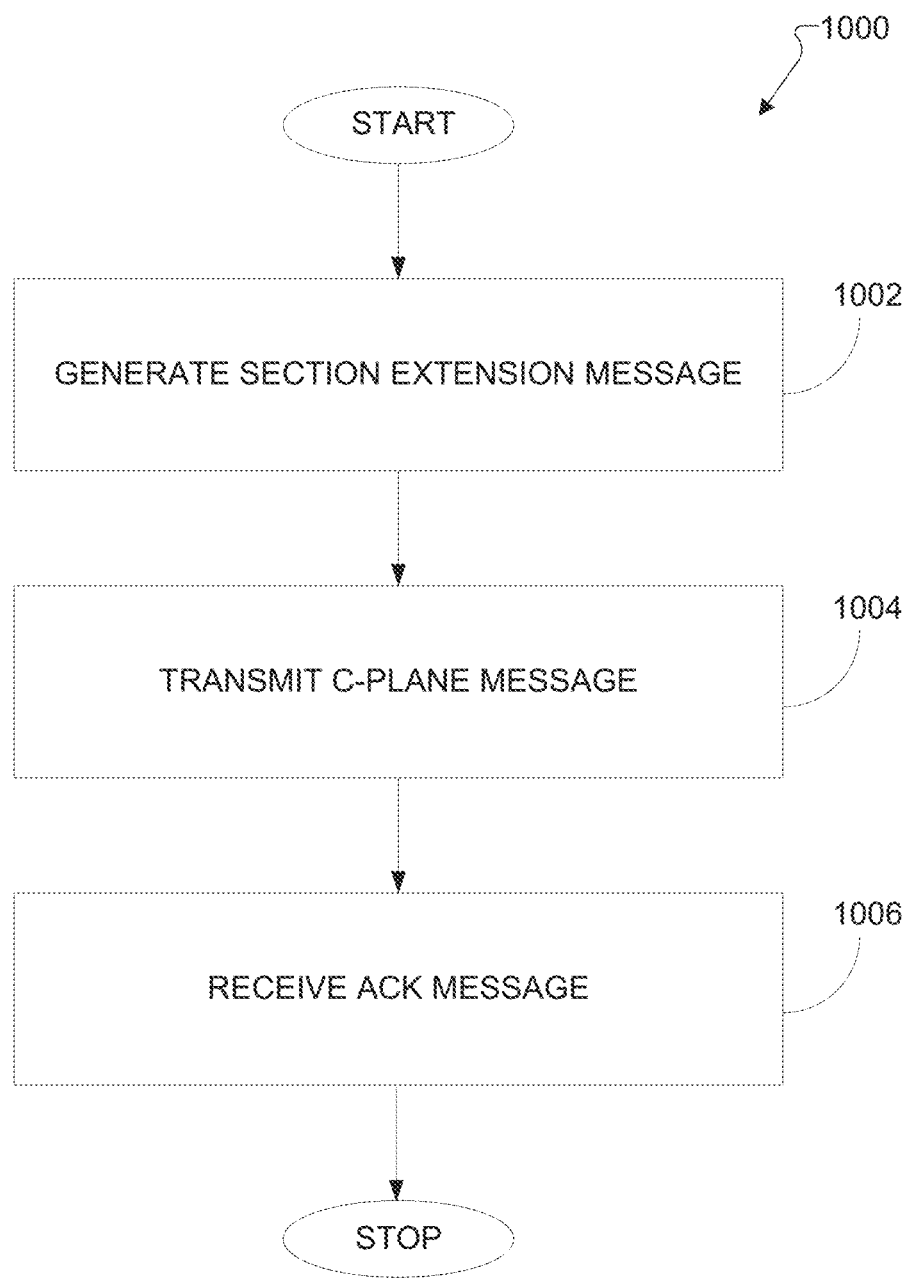
FIG. 10 illustrates a flowchart of method for robust message transmission and reception over a fronthaul network according to embodiments of the present disclosure.

FIG. 10 illustrates a flowchart of method 1000 for robust message transmission and reception over a fronthaul network according to embodiments of the present disclosure. The method 1000 as may be performed by an O-DU (e.g., transmitter device), for example network entity (e.g., network 102, 104, 116, 118, and 200 as illustrated in FIG. 2) and/or a client device (e.g., 106-114 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 may be performed by an O-DU. The O-DU may be implemented in base station and communicate with an O-RU (e.g., receiver device). The O-RU may be implemented in an RRH or a TRP. A fronthaul link between the O-DU and O-RU is established to support the robust message transmission between the O-DU and O-RU. The O-DU may include a RLC protocol layer, a MAC protocol layer, and a PHY protocol layer. The O-RU may include a lower PHY layer and an RF layer.

In one embodiment, protocol stacks including an RLC protocol layer, a MAC protocol layer, a PHY protocol layer, and an RF layer may be flexibly implemented regardless the specific hardware or type of devices. In other words, such protocol stack to perform the role of O-DU and O-RU as mentioned in the present disclosure may be freely implemented in any type of electronic device.

As illustrated in FIG. 10, in step 1002, a DU (e.g., O-DU) of a base station generates a section extension for an ACK/NACK request including an ackNackReqId field and an extLen field, wherein the ackNackReqId field indicates the ACK/NACK request ID of a section description and the extLen field indicates a size of the section extension.

Subsequently, in step 1004, the DU transmits, to an RU, the C-plane message including the section extension for the ACK/NACK request.

Finally, in step 1006, the DU receives, from the RU, an ACK message corresponding to the C-plane message.

In one embodiment, the ACK message includes a numberOfAcks field indicating a number of ACKs included in the ACK message and an ackId field indicating that a section description included in the C-plane message was correctly received and decoded by the RU, the ackId field corresponding to the ackNackReqId of the section description.

In one embodiment, the ACK message includes a numberOfNacks field indicating a number of NACKs included in the ACK message and a nackId field indicating that a section description included in the C-plane message was not correctly received by the RU, the nackId field corresponding to the ackNackReqId of the section description.

In one embodiment, the DU transmits a set of C-plane messages and each C-plane message includes the section extension, respectively.

In one embodiment, the DU identifies an ACK receive window comprising a minimum window value (ta3_min ack) and a maximum window value (ta3_max_ack) for a symbol M to receive the ACK message including at least one of an ackId or a nackId, the symbol M being a value of a startSymbolId in the C-plane message carrying the section extension, determines whether the ACK message or a NACK message is received within the ACK receive window, and the DU further retransmits another section description based on a determination that the ACK message or the NACK message has not received within the ACK receive window. In such embodiment, the other section description is same as the section description or a new section description that is updated from the section description, or skip retransmission of the section description based on the determination that the ACK message has not received within the ACK receive window. In such embodiment, the ta3_min_ack and the ta3_max_ack are measured between from a reception at an RU antenna to a reception at an RU port.

In one embodiment, the DU identifies an ACK receive window for a symbol M to receive the ACK message including an ackId and a nackId, the symbol M being a value of startSymbolId in the C-plane message carrying the section extension, determine whether the ACK message, received within the ACK receive window, includes the nackId, and the DU further retransmits, based on the nackId, the section description to the RU.

In one embodiment, the DU determines whether the ACK message includes a NACK ID (nackId) and skip transmitting, to the RU, the U-plane message corresponding to the C-plane message including the section description corresponding to the nackId when the ACK message is received before sending the C-plane message.

Figure 11:
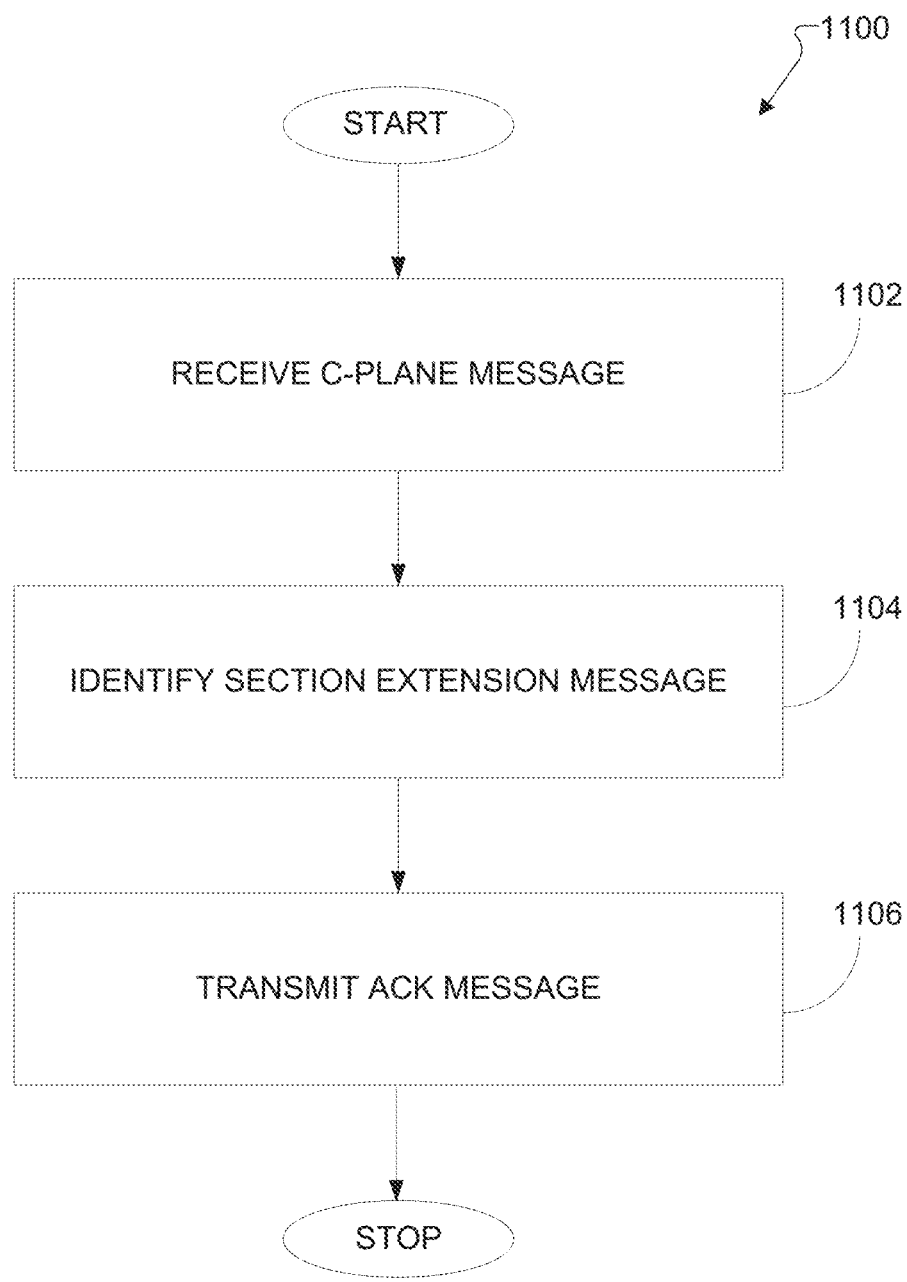
FIG. 11 illustrates a flowchart of method for robust message transmission and reception over a fronthaul network according to embodiments of the present disclosure.

FIG. 11 illustrates a flowchart of method 1100 for robust message transmission and reception over a fronthaul network according to embodiments of the present disclosure. The method 1100 as may be performed by an O-RU (e.g., receiver device), for example network entity (e.g., network 102, 104, 116, 118, and 200 as illustrated in FIG. 2) and/or a client device (e.g., 106-114 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 may be performed by an O-RU. The O-RU may be implemented in base station and communicate with an O-DU (e.g., transmitter device). The O-RU may be implemented in an RRH, a TRP, or a UE. A fronthaul link between the O-DU and O-RU is established to support the robust message transmission between the O-DU and O-RU.

As illustrated in FIG. 11, the method 1100 begins at step 1102. In step 1102, the RU receives, from a DU, a C-plane message including a section extension for an ACK/NACK request.

Next, in step 1104, the RU identifies the section extension included in the C-plane message for the ACK/NACK request including an ackNackReqId field and an extLen field. In one example, the ackNackReqId field indicates the ACK/NACK request ID of a section description and the extLen field indicates a size of the section extension.

Finally, in step 1106, the RU transmits, to the DU, an ACK message corresponding to the C-plane message.

In one embodiment, the ACK message includes a numberOfAcks field indicating a number of ACKs included in the ACK message and an ackId field indicating that a section description included in the C-plane message was correctly received by the RU, the ackId field corresponding to the ackNackReqId of the section description.

In one embodiment, the ACK message includes a numberOfNacks field indicating a number of NACKs included in the ACK message and a nackId field indicating that a section description included in the C-plane message was not correctly received by the RU, the nackId field corresponding to the ackNackReqId of the section description.

In one embodiment, the RU receives a set of C-plane messages, each C-plane message including the section extension, respectively.

In one embodiment, the RU receive a retransmission of the section description based on a determination that the ACK message has not received within an ACK receive window comprising a ta3_min ack and a ta3_max_ack, the retransmitted section description being same as the section description that was previously received or a new section description that is updated from the previously received section description. The ACK receive window is identified for a symbol M to receive the ACK message including at least one of an ackId or a nackId, the symbol M being a value of a startSymbolId in the C-plane message carrying the section extension and the ta3_min_ack and the ta3_max_ack measured between from a reception at an RU antenna to a reception at an RU port.

In one embodiment, the RU receives, based on the nackId, a retransmission of the section description to the RU and an ACK receive window is identified for a symbol M to receive the ACK message including an ackId and a nackId, the symbol M being a value of startSymbolId in the C-plane message carrying the section extension.

In one embodiment, the RU skips receiving, from the DU, the C-plane message including the section description corresponding to the nackId when the ACK message is received before sending the C-plane message.

Figure 12:
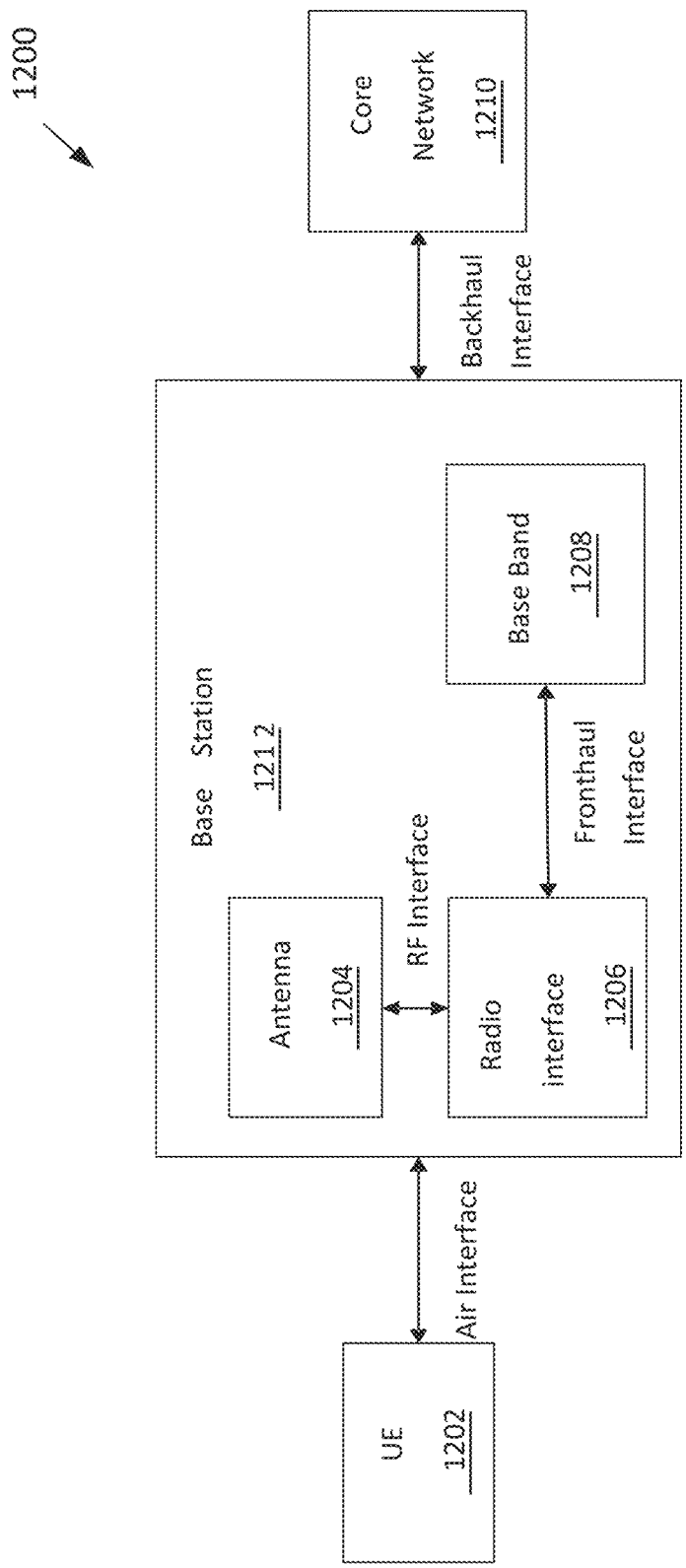
FIG. 12 illustrates an example of fronthaul interface according to embodiments of the present disclosure.

FIG. 12 illustrates an example of fronthaul interface 1200 according to embodiments of the present disclosure. An embodiment of the fronthaul interface 1200 shown in FIG. 12 is for illustration only.

As illustrated in FIG. 12, the network architecture 1200 includes a UE 1202 (e.g., 106-114 as illustrated in FIG. 1), a base station (BS) 1212 (e.g., 104, 116, and 118 as illustrated in FIG. 1), and a core network 1210. The BS 1212 further comprises an antenna 1204, a radio interface 1206, and a base band 1208. The UE 1202 and the BS 1212 are connected via an air interface. The BS 1212 and the core network 1210 are connected via a backhaul interface. The antenna 1204 and the radio interface 1206 are connected via an RF interface, and the radio interface 1206 and the base band 1208 are connected via a fronthaul interface.

A DL/UL control message may be transmitted and received between the radio interface 1206 and the base band 1208. A transmitter device and a receiver device may be implemented in the radio interface 1206 and/or the base bad 1208 in order to transmit and receive the DL/UL control message.

In the current xRAN/O-RAN specification, 5 candidate compression technologies are used to accommodate the efficient fronthaul bandwidth (BW) utilization. Among these candidates, in simple implementation perspective, a block floating is a good candidate. In BW efficiency perspective, modulation compression is highly recommended for DL. The motivation of "Modulation compression" shows the perfect picture to enable the efficient fronthaul BW with the ideal compression performance without any system performance loss. But, considering "Modulation compression," there were some operational defects which should be remedied in the current specification. That is, co-existence of several different data within a PRB, after RE mapping. In addition, "power offset" information for each channel are required to clarification.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by an open-radio access network (O-RAN) distributed unit (O-DU), the method comprising:
    transmitting, to an O-RAN radio unit (O-RU) through a fronthaul interface, one or more control plane (C-plane) messages; and
    receiving, from the O-RU through the fronthaul interface, an acknowledgement (ACK)/negative-acknowledgement (NACK) feedback message for the one or more C-plane messages,
    wherein each C-plane message of the one or more C-plane messages includes section extension information for requesting ACK/NACK feedback,
    wherein the section extension information includes a request identifier (ID) used to identify a section description for which the ACK/NACK feedback is requested, and
    wherein the ACK/NACK feedback message includes at least one of ACK information for indicating a request ID of a correctly decoded section description or NACK information for indicating a request ID of an incorrectly decoded section description.

2. The method of claim 1, wherein the incorrectly decoded section description is dropped after section extension information associated with the incorrectly decoded section description is decoded.

3. The method of claim 1,
    wherein the section extension information includes an extension type for an ACK/NACK request and an extension length indicating a size of the section extension information as one word corresponding to 4 bytes,
    wherein the extension type is indicated by 7 bits of the section extension information,
    wherein the extension length is indicated by 8 bits of the section extension information, and
    wherein the request ID is indicated by 16 bits of the section extension information.

4. The method of claim 1, further comprising:
    based on identifying that an ACK/NACK status of a section description in the one or more C-plane messages is not received by an end of a receive window, identifying that the section description is dropped before section extension information corresponding to the dropped section description is decoded.

5. The method of claim 1,
    wherein the ACK/NACK feedback message is associated with a C-plane message and includes a transport header and an application header,
    wherein the application header includes a frame identifier, a subframe identifier, a slot identifier, and a section type indicating a section type 8 for sending ACK/NACK from the O-RU to the O-DU,
    wherein the ACK/NACK feedback message includes information for indicating a number of ACKs included in the ACK/NACK feedback message and information for indicating a number of NACKs included in the ACK/NACK feedback message,
    wherein the number of ACKs is indicated by 8 bits of the ACK/NACK feedback message, and
    wherein the number of NACKs is indicated by 8 bits of the ACK/NACK feedback message.

6. A method performed by an open-radio access network (O-RAN) radio unit (O-RU), the method comprising:
    receiving, from an O-RAN distributed unit (O-DU) through a fronthaul interface, one or more control plane (C-plane) messages; and transmitting, to the O-RU through the fronthaul interface, an acknowledgement (ACK)/negative-acknowledgement (NACK) feedback message for the one or more C-plane messages, wherein each C-plane message of the one or more C-plane messages includes section extension information for requesting ACK/NACK feedback, wherein the section extension information includes a request identifier (ID) used to identify a section description for which the ACK/NACK feedback is requested, and wherein the ACK/NACK feedback message includes at least one of ACK information for indicating a request ID of a correctly decoded section description or NACK information for indicating a request ID of an incorrectly decoded section description.

7. The method of claim 6, wherein the incorrectly decoded section description is dropped after section extension information associated with the incorrectly decoded section description is decoded.

8. The method of claim 6,
wherein the section extension information includes an extension type for an ACK/NACK request and an extension length indicating a size of the section extension information as one word corresponding to 4 bytes,
wherein the extension type is indicated by 7 bits of the section extension information,
wherein the extension length is indicated by 8 bits of the section extension information, and
wherein the request ID is indicated by 16 bits of the section extension information.

9. The method of claim 6, wherein the ACK/NACK feedback message is transmitted within an ACK transmit window.

10. The method of claim 6,
wherein the ACK/NACK feedback message is associated with a C-plane message and includes a transport header and an application header,
wherein the application header includes a frame identifier, a subframe identifier, a slot identifier, and a section type indicating a section type 8 for sending ACK/NACK from the O-RU to the O-DU,
wherein the ACK/NACK feedback message includes information for indicating a number of ACKs included in the ACK/NACK feedback message and information for indicating a number of NACKs included in the ACK/NACK feedback message,
wherein the number of ACKs is indicated by 8 bits of the ACK/NACK feedback message, and
wherein the number of NACKs is indicated by 8 bits of the ACK/NACK feedback message.

11. A device of an open-radio access network (O-RAN) distributed unit (O-DU), the device comprising:
a transceiver; and
a processor operably coupled to the transceiver and configured to control the transceiver to:
transmit, to an O-RAN radio unit (O-RU) through a fronthaul interface, one or more control plane (C-plane) messages; and
receive, from the O-RU through the fronthaul interface, an acknowledgement (ACK)/negative-acknowledgement (NACK) feedback message for the one or more C-plane messages,
wherein each C-plane message of the one or more C-plane messages includes section extension information for requesting ACK/NACK feedback, wherein the section extension information includes a request identifier (ID) used to identify a section description for which the ACK/NACK feedback is requested, and
wherein the ACK/NACK feedback message includes at least one of ACK information for indicating a request ID of a correctly decoded section description or NACK information for indicating a request ID of an incorrectly decoded section description.

12. The device of claim 11, wherein the incorrectly decoded section description is dropped after section extension information associated with the incorrectly decoded section description is decoded.

13. The device of claim 11,
wherein the section extension information includes an extension type for an ACK/NACK request and an extension length indicating a size of the section extension information as one word corresponding to 4 bytes,
wherein the extension type is indicated by 7 bits of the section extension information,
wherein the extension length is indicated by 8 bits of the section extension information,
wherein the request ID is indicated by 16 bits of the section extension information.

14. The device of claim 11, wherein the processor is further configured to, based on identification that an ACK/NACK status of a section description in the one or more C-plane messages is not received by an end of a receive window, identify that the section description is dropped before section extension information corresponding to the dropped section description is decoded.

15. The device of claim 11,
wherein the ACK/NACK feedback message is associated with a C-plane message and includes a transport header and an application header,
wherein the application header includes a frame identifier, a subframe identifier, a slot identifier, and a section type indicating a section type 8 for sending ACK/NACK from the O-RU to the O-DU,
wherein the ACK/NACK feedback message includes information for indicating a number of ACKs included in the ACK/NACK feedback message and information for indicating a number of NACKs included in the ACK/NACK feedback message,
wherein the number of ACKs is indicated by 8 bits of the ACK/NACK feedback message, and
wherein the number of NACKs is indicated by 8 bits of the ACK/NACK feedback message.

16. A device of an open-radio access network (O-RAN) radio unit (O-RU), the device comprising:
a transceiver; and
a processor operably coupled to the transceiver and configured to control the transceiver to:
receive, from an O-RAN distributed unit (O-DU) through a fronthaul interface, one or more control plane (C-plane) messages, and
transmit, to the O-RU through the fronthaul interface, an acknowledgement (ACK)/negative-acknowledgement (NACK) feedback message for the one or more C-plane messages,
wherein each C-plane message of the one or more C-plane messages includes section extension information for requesting ACK/NACK feedback,
wherein the section extension information includes a request identifier (ID) used to identify a section description for which the ACK/NACK feedback is requested, and wherein the ACK/NACK feedback message includes at least one of ACK information for indicating a request ID of a correctly decoded section description or NACK information for indicating a request ID of an incorrectly decoded section description.

17. The device of claim 16, wherein the incorrectly decoded section description is dropped after section extension information associated with the incorrectly decoded section description is decoded.

18. The device of claim 16,
wherein the section extension information includes an extension type for an ACK/NACK request and an extension length indicating a size of the section extension information as one word corresponding to 4 bytes,
wherein the extension type is indicated by 7 bits of the section extension information,
wherein the extension length is indicated by 8 bits of the section extension information,
wherein the request ID is indicated by 16 bits of the section extension information.

19. The device of claim 16,
wherein the ACK/NACK feedback message is associated with a C-plane message and includes a transport header and an application header,
wherein the application header includes a frame identifier, a subframe identifier, a slot identifier, and a section type indicating a section type 8 for sending ACK/NACK from the O-RU to the O-DU,
wherein the ACK/NACK feedback message includes information for indicating a number of ACKs included in the ACK/NACK feedback message and information for indicating a number of NACKs included in the ACK/NACK feedback message,
wherein the number of ACKs is indicated by 8 bits of the ACK/NACK feedback message, and
wherein the number of NACKs is indicated by 8 bits of the ACK/NACK feedback message.

20. A method performed by an open-radio access network (O-RAN) distributed unit (O-DU), the method comprising:

transmitting, to an O-RAN radio unit (O-RU) through a fronthaul interface, a control plane (C-plane) message; and receiving, from the O-RU through the fronthaul interface, an acknowledgement (ACK)/negative-acknowledgement (NACK) feedback message for the C-plane message, wherein the C-plane message includes section extension information for an ACK/NACK request, wherein the section extension information includes an extension type for indicating the ACK/NACK request, an extension length indicating a size of the section extension information as one word corresponding to 4 bytes, and a request identifier (ID) used to identify a section description for the ACK/NACK request, and wherein the extension type is indicated by 7 bits, the extension length is indicated by 8 bits, and the request ID is indicated by 16 bits, wherein the ACK/NACK feedback message is associated with a C-plane message and includes a transport header and an application header, wherein the application header includes a frame identifier, a subframe identifier, a slot identifier, and a section type indicating a section type 8 for sending ACK/NACK from the O-RU to the O-DU, wherein the ACK/NACK feedback message includes information for indicating a number of ACKs included in the ACK/NACK feedback message, information for indicating a number of NACKs included in the ACK/NACK feedback message, and at least one of ACK information for indicating a request ID of a correctly decoded section description or NACK information for indicating a request ID of an incorrectly decoded section description, wherein the number of ACKs is indicated by 8 bits and the number of NACKs is indicated by 8 bits.

* * * * *